United States Patent [19]

Ueki

[11] Patent Number: 5,304,902
[45] Date of Patent: * Apr. 19, 1994

[54] APPARATUS FOR DRIVING A BRUSHLESS DC MOTOR

[75] Inventor: Yasuhiro Ueki, Sagamihara, Japan

[73] Assignee: Victor Company of Japan, Ltd., Yokohama, Japan

[*] Notice: The portion of the term of this patent subsequent to Mar. 9, 2010 has been disclaimed.

[21] Appl. No.: 996,436

[22] Filed: Dec. 24, 1992

Related U.S. Application Data

[63] Continuation of Ser. No. 706,594, May 30, 1991, Pat. No. 5,192,900.

[30] Foreign Application Priority Data

Jun. 5, 1990 [JP] Japan ................................ 2-146590

[51] Int. Cl.$^5$ .............................................. H02P 6/00
[52] U.S. Cl. .................................... 318/254; 318/439
[58] Field of Search ............... 318/254, 434, 138, 139, 318/439, 437, 799–812, 628, 615–618; 361/23, 30, 33

[56] References Cited

U.S. PATENT DOCUMENTS

| | | | |
|---|---|---|---|
| 4,385,265 | 5/1983 | Uzuka | 318/158 |
| 4,460,859 | 7/1984 | Remus et al. | 318/254 |
| 4,588,933 | 5/1986 | Suj | 318/254 |
| 4,641,066 | 2/1987 | Nagata et al. | 318/254 |
| 4,642,538 | 2/1987 | Elliott et al. | 318/139 |
| 4,712,050 | 12/1987 | Nagasawa et al. | 318/254 |
| 4,743,815 | 5/1988 | Gee et al. | 318/254 |
| 4,780,651 | 10/1988 | Nahano et al. | 318/254 |
| 4,874,993 | 10/1989 | Tanaka et al. | 318/254 |
| 4,900,993 | 2/1990 | Yashohara et al. | 318/254 |
| 4,922,169 | 5/1990 | Freeman | 318/254 |
| 5,013,985 | 5/1991 | Itoh et al. | 318/254 X |
| 5,192,900 | 3/1993 | Ueki | 318/254 |

FOREIGN PATENT DOCUMENTS

61-3193 7/1986 Japan.
63-69489 7/1988 Japan.

Primary Examiner—Jonathan Wysocki
Attorney, Agent, or Firm—Lowe, Price, LeBlanc & Becker

[57] ABSTRACT

A brushless dc motor has polyphase stator windings and a rotor. The polyphase stator windings have first ends and second ends. The first ends are connected in common at a common junction. Two of the second ends are sequentially selected and a drive current is supplied between the selected two second ends to rotate the rotor. The rotor has magnetic poles arranged in a predetermined configuration. A voltage at the common junction is measured. A rotation of the rotor is controlled in response to the measured common-junction voltage.

52 Claims, 6 Drawing Sheets

APPARATUS FOR DRIVING A BRUSHLESS DC MOTOR

This application is a continuation of application Ser. No. 07/706,594, filed May 30, 1991 U.S. Pat. No. 5,192,900.

BACKGROUND OF THE INVENTION

1. Field of the Invention

This invention relates to a method of driving a brushless dc motor. This invention also relates to an apparatus for driving a brushless dc motor.

2. Description of the Prior Art

General brushless dc motors include a stator having windings and a rotor having permanent magnets. The stator windings are supplied with drive currents. To drive the rotor satisfactorily, it is necessary to sequentially change the drive currents in response to the angular relation (the positional relation) between the stator windings and the magnetic poles of the rotor.

Some of prior art apparatuses for driving a brushless dc motor include position sensors detecting the angular relation (the positional relation) between stator windings and magnetic poles of a rotor. Drive currents fed to the stator windings are sequentially changed in response to the output signals from the position sensors.

Japanese published examined patent application 61-3193 discloses a prior art advanced apparatus for driving a brushless dc motor which dispenses with position sensors. This prior art advanced apparatus uses the following fact. In a brushless dc motor, as a rotor rotates, voltages are induced in stator windings in dependence on the positional relation between the stator windings and magnetic poles of the rotor. The induced voltages are opposite to drive voltages related to drive currents fed to the stator windings. The induced voltages are generally referred to as "back" voltages. In the prior art advanced apparatus of Japanese patent application 61-3193, the induced voltages are detected as an indication of the positional relation between the stator windings and the magnetic poles of the rotor, and the detected voltages are used for the control of the change of the drive currents. The prior art advanced apparatus of Japanese patent application 61-3193 tends to be complicated in structure.

SUMMARY OF THE INVENTION

It is an object of this invention to provide an improved method of driving a brushless dc motor.

It is another object of this invention to provide an improved apparatus for driving a brushless dc motor.

A first aspect of this invention provides a method of driving a brushless dc motor having polyphase stator windings and a rotor, the polyphase stator windings having first ends and second ends, the first ends being connected in common at a common junction, wherein two of the second ends are sequentially selected and a drive current is supplied between the selected two second ends to rotate the rotor, the rotor having magnetic poles arranged in a predetermined configuration, the method comprising the steps of measuring a voltage at the common junction; and controlling a rotation of the rotor in response to the measured common-junction voltage.

A second aspect of this invention provides a method of driving a brushless dc motor having polyphase stator windings and a rotor, the polyphase stator windings having first ends and second ends, the first ends being connected in common at a common junction, wherein two of the second ends are sequentially selected and a drive current is supplied between the selected two second ends to rotate the rotor, the rotor having magnetic poles arranged in a predetermined configuration, the method comprising the steps of sequentially measuring a voltage at one of the second ends when said one of the second ends is not supplied with the drive current, and thereby obtaining measured values of the voltages at the second ends respectively; and controlling a rotation of the rotor in response to the measured values of the voltages at the second ends.

A third aspect of this invention provides an apparatus comprising a brushless dc motor having polyphase stator windings and a rotor, the polyphase stator windings having first ends and second ends, the first ends being connected in common at a common junction, and means for selecting two of the polyphase stator windings and supplying a drive current to the selected two stator windings via the second ends of the selected two stator windings, and for sequentially changing the selected two stator windings among the polyphase stator windings to rotate the rotor; the improvement comprising means for measuring a voltage at the common junction; and means for controlling a change of the selected two stator windings in response to the measured common-junction voltage.

A fourth aspect of this invention provides an apparatus comprising a brushless dc motor having polyphase stator windings and a rotor, the polyphase stator windings having first ends and second ends, the first ends being connected in common at a common junction, and means for selecting two of the polyphase stator windings and supplying a drive current to the selected two stator windings via the second ends of the selected two stator windings, and for sequentially changing the selected two stator windings among the polyphase stator windings to rotate the rotor; the improvement comprising means for measuring a voltage at a second end of a non-selected stator winding among the polyphase stator windings, and executing said measuring for each of the polyphase stator windings to obtain measured values of voltages at the second ends of the polyphase stator windings; and means for controlling a change of the selected two stator windings in response to the measured values of the voltages at the second ends.

DESCRIPTION OF THE FIRST PREFERRED EMBODIMENT

Figure 1:
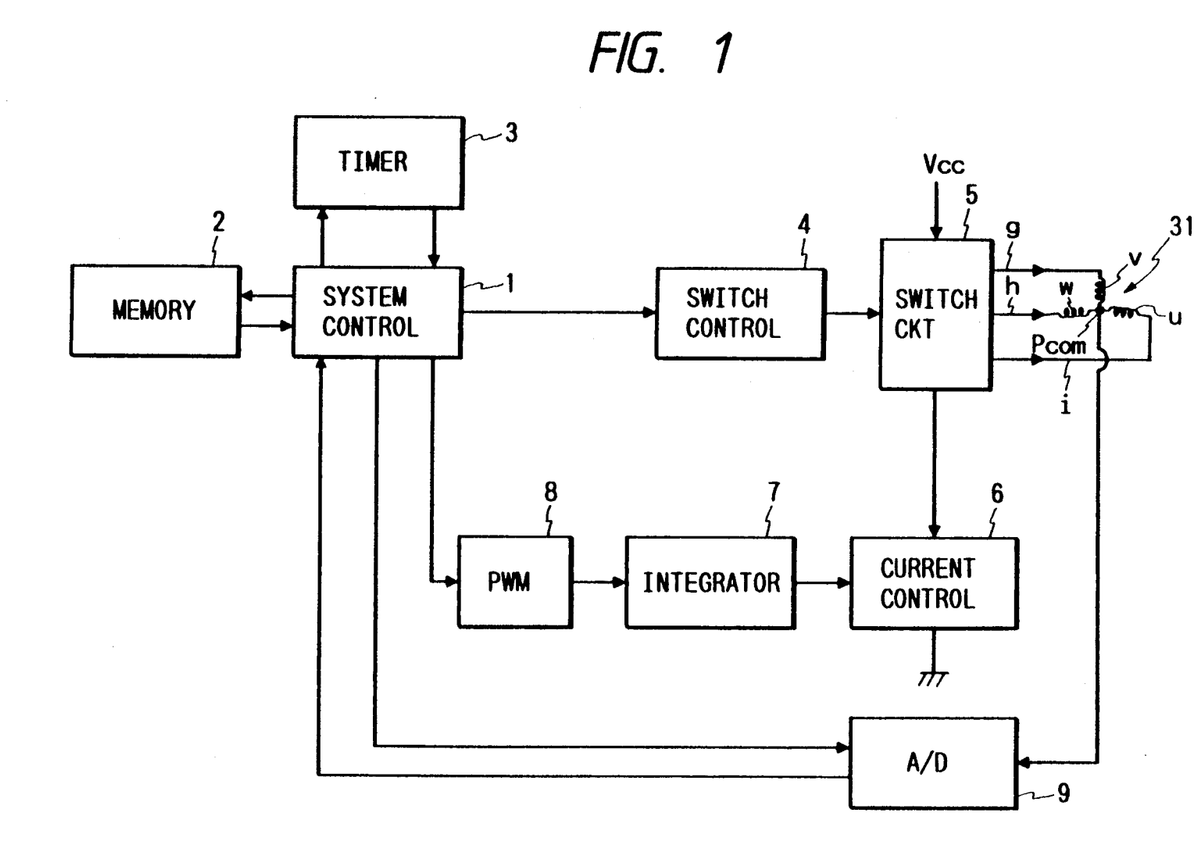
FIG. 1 is a block diagram of a brushless dc motor and a drive apparatus according to a first embodiment of this invention.

With reference to FIG. 1, a system controller 1 includes a microprocessor unit having a combination of a CPU, a ROM, a RAM, and an I/O circuit. As will be explained later, the system controller 1 operates in accordance with a program stored in the ROM.

The system controller 1 is connected to a memory 2, a timer 3, a switch controller 4, a pulse-width modulator 8, and an analog-to-digital converter (an A/D converter) 9. The switch controller 4 is connected to a current switching circuit 5. The current switching circuit 5 is connected to a current controller 6. An integrator 7 is connected between the pulse-width modulator 8 and the current controller 6.

A brushless dc motor includes a stator 31 having three-phase windings "U", "V", and "W". One ends of the stator windings "U", "V", and "W" are connected in common at a junction Pcom. The other ends "i", "g", and "h" of the stator windings "U", "V", and "W" are connected to the current switching circuit 5. The common junction Pcom between the stator windings "U", "V", and "W" is connected to the A/D converter 9.

Two of the ends "i", "g", and "h" of the stator windings "U", "V", and "W" are selected by the current switching circuit 5, and a drive current is supplied between the selected two stator winding ends by the current switching circuit 5. In this way, two of the stator windings "U", "V", and "W" are selected and energized. The combination of the switch controller 4 and the current switching circuit 5 sequentially changes the selected two stator windings, that is, the two energized stator windings, among all the stator windings "U", "V", and "W" in response to a signal outputted from the system controller 1 to the switch controller 4. The current switching circuit 5 conducts a current from a power supply line Vcc to the selected stator windings as a drive current.

The current controller 6 is disposed in an electric path for conducting the drive current between a power supply and the stator windings "U", "V", and "W". The current controller 6 can vary the level of the drive current. The combination of the pulse width modulator 8, the integrator 7, and the current controller 6 controls the level of the drive current in response to a signal outputted from the system controller 1 to the pulse width modulator 8.

A voltage Vcom at the common junction Pcom between the stator windings "U", "V", and "W" is transmitted to the A/D converter 9. The A/D converter 9 converts the common-junction voltage Vcom into a corresponding digital signal. The output digital signal from the A/D converter 9 is fed to the system controller 1 so that the system controller 1 is informed of the common-junction voltage Vcom.

The system controller 1 generates the output signal to the switch controller 4 in response to the informed common-junction voltage Vcom, so that the change of the energized stator windings is controlled in response to the common-junction voltage Vcom.

Figure 2:
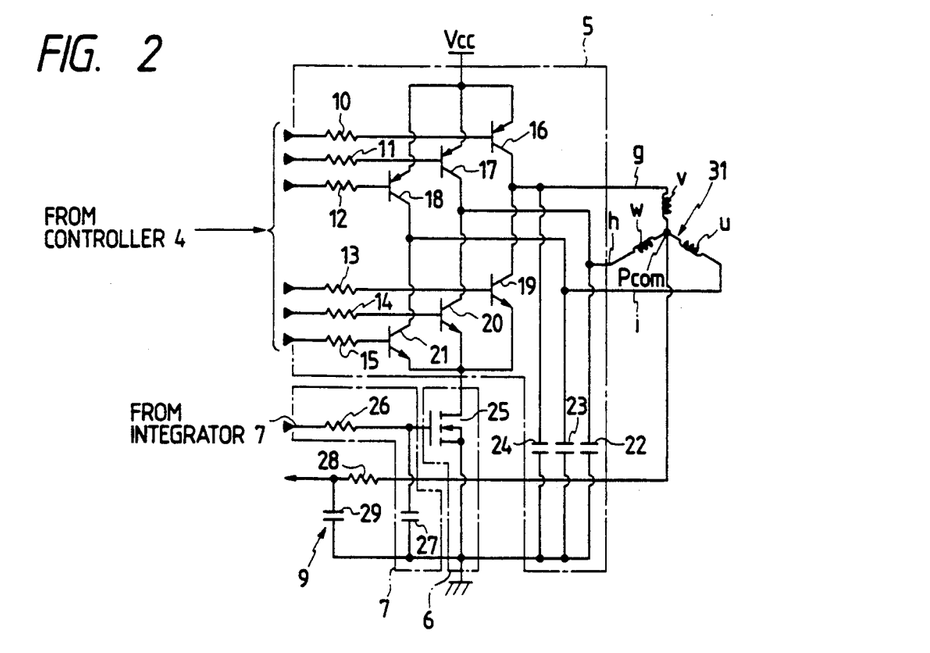
FIG. 2 is a schematic diagram of the brushless dc motor and a portion of the drive apparatus of FIG. 1.

As shown in FIG. 2, the current switching circuit 5 includes resistors 10-15, PNP transistors 16-18, NPN transistors 19-21, and capacitors 22-23. The emitters of the transistors 16-18 are connected in common to a power feed line Vcc extending from the positive terminal of a drive dc power source. The negative terminal of the drive power source is grounded. The collectors of the transistors 16-18 are connected to the collectors of the transistors 19-21 respectively. The emitters of the transistors 19-21 are connected in common to the current controller 6. The bases of the transistors 16-21 are connected to the switch controller 4 via the resistors 10-15 respectively. The junction between the collectors of the transistors 16 and 19 leads to the end "g" of the stator winding "V". The junction between the collectors of the transistors 17 and 20 leads to the end "h" of the stator winding "W". The junction between the collectors of the transistors 18 and 21 leads to the end "i" of the stator winding "U". The junction between the collectors of the transistors 16 and 19 is grounded via the capacitor 24. The junction between the collectors of the transistors 17 and 20 is grounded via the capacitor 22. The junction between the collectors of the transistors 18 and 21 is grounded via the capacitor 23. The transistors 16-21 serve as switches which change the supply of the drive current to the stator windings "U", "V", and "W" in response to output signals from the switch controller 4.

As shown in FIG. 2, the integrator 7 includes a combination of a resistor 26 and a capacitor 27. The current controller 6 includes a field effect transistor 25. The junction between the resistor 26 and the capacitor 27 within the integrator 7 is connected to the gate of the transistor 25 within the current controller 6. The emitters of the transistors 19-21 within the current switching circuit 5 are grounded via the source-drain path of the transistor 25 within the current controller 6. The transistor 25 within the current controller 6 controls the level of the drive current to the stator windings "U", "V", and "W" in response to an output signal from the integrator 7.

As shown in FIG. 2, a front end of the A/D converter 9 includes a combination of a resistor 28 and a capacitor 29 which form a low pass filter connected to the common junction Pcom between the stator windings "U", "V", and "W".

Figure 3:
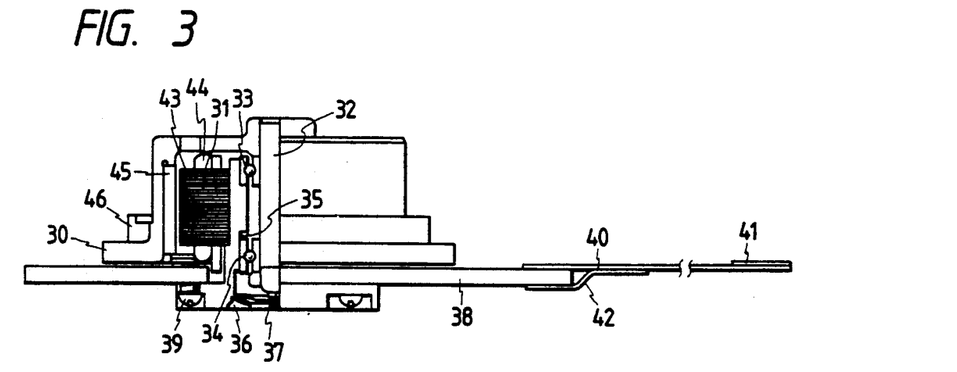
FIG. 3 is a view, partially in cross section, of the brushless dc motor.

As shown in FIG. 3, the brushless dc motor includes a rotor 30 mounted on a rotor shaft 32. The rotor shaft 32 is rotatably supported by bearings 33 and 34. The rotor shaft 32 is resiliently supported via springs 35 and 36, and a contact spring 37. A printed circuit board 38 has a metal base for the stator 31. The printed circuit board 38 is fixed by screws 39. A flexible connection-line board 40 extends from the printed circuit board 38. A tape 42 supports the connection between the printed circuit board 38 and the connection-line board 40. A tape 41 supports the connection between the connection-line board 40 and a subsequent member (not shown). The stator 31 has ferromagnetic cores 43 provided with stator windings 44, that is, the stator windings "U", "V", and "W" in FIGS. 1 and 2. Permanent magnets 45 are mounted on the rotor 30. A holder 46 mounted on the rotor 30 serves to hold a member, such as a magnetic disk, rotated by the brushless dc motor.

Figure 4:
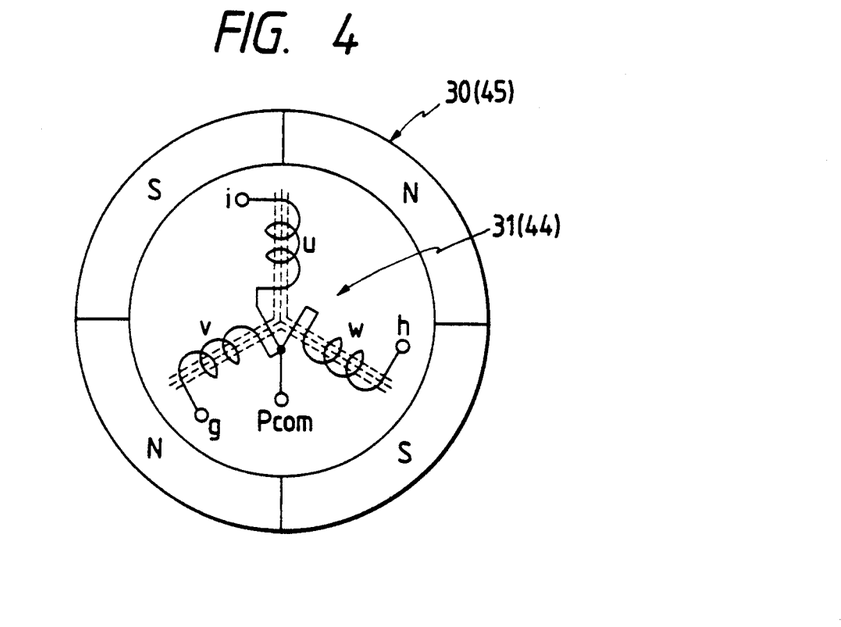
FIG. 4 is a diagram of the stator, the stator windings, and the rotor of the brushless dc motor.

As shown in FIG. 4, the rotor 30 is formed with four magnetic poles "S" and "N" which are alternately arranged along the circumference of the rotor 30 and which occupy equal angular ranges. In the illustration of FIG. 4, the three cores, which are denoted by the broken lines, extend radially from the center of the stator 31 and are spaced at equal angular intervals. The stator windings "U", "V", and "W" are formed on the three cores respectively. The ends of the stator windings "U", "V", and "W" which are close to the center of the stator 31 are connected together at the common junction Pcom.

Two of the stator windings "U", "V", and "W" are sequentially selected and the selected stator windings are supplied with a drive current for a period corresponding to an electric angle of 120 degrees by the current switching circuit 5, and thereby the rotor 30 is rotated. During the rotation of the rotor 30, "back" voltages are induced in the selected stator windings (the energized stator windings). The back voltages represent the positional relation between the stator windings "U", "V", and "W" and the magnetic poles of the rotor 30. The voltage Vcom at the common junction Pcom between the stator windings "U", "V", and "W" depends on the back voltages and also another factor which is mainly determined by a power supply line voltage. Now, the latter factor is defined as corresponding to a reference voltage. Provided that the reference voltage is accurately measured, the back voltages can be accurately detected by comparing the common-junction voltage Vcom with the reference voltage.

A description will be given of techniques for accurately estimating the non-back-voltage component of the common-junction voltage Vcom, that is, the reference voltage. According to a first technique, under conditions where the rotor 30 remains locked, drive currents are supplied and the common-junction voltage Vcom is measured for each of different selections of two of the stator windings "U", "V", and "W". The average of the measured values of the common-junction voltage Vcom is calculated. The calculated average is used as the reference voltage. Data of the obtained reference voltage is previously stored into the memory 2. According to a second technique, under conditions where drive currents are supplied and the rotor 30 remains rotated, the common-junction voltage Vcom is measured and the measured value of the common-junction voltage Vcom is averaged during a predetermined long time by an integrator for each of different selections of two of the stator windings "U", "V", and "W". The mean of the average values of the common-junction voltage Vcom is calculated. The calculated means is used as the reference voltage. Data of the obtained reference voltage is previously stored into the memory 2.

Figure 5:
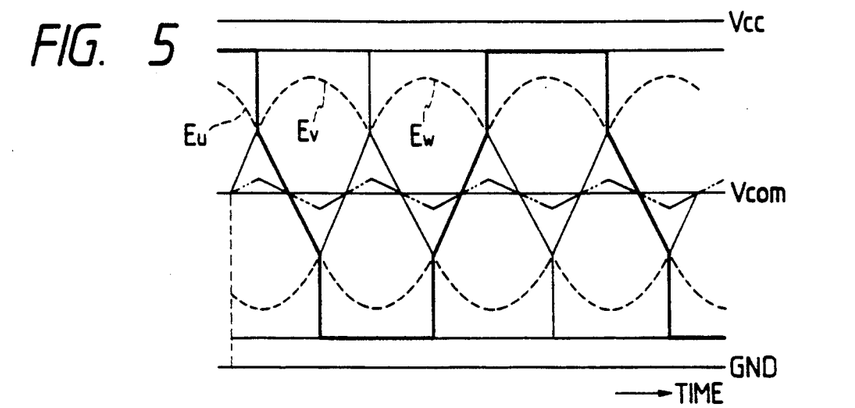
FIGS. 5–7 are time-domain diagrams showing the waveforms of voltages in the brushless dc motor.
Figure 6:
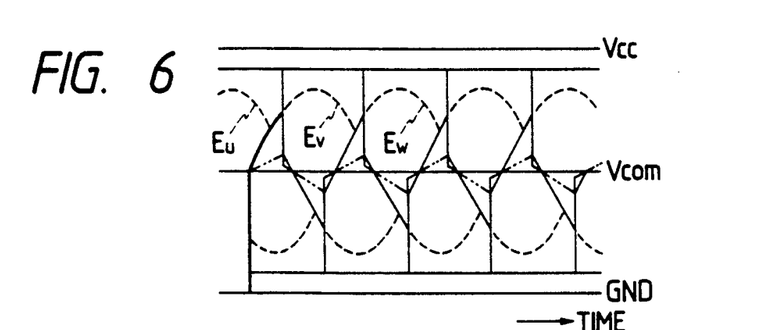
Figure 7:
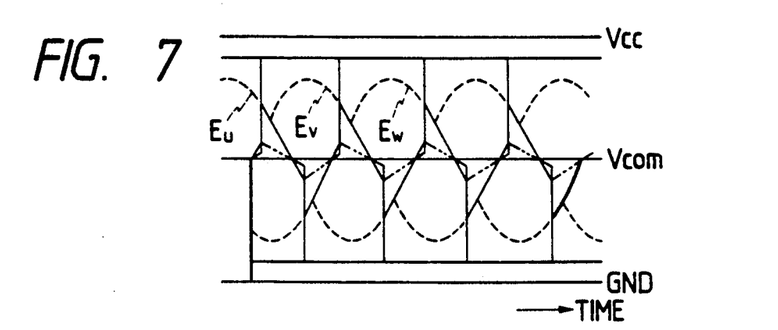
Figure 8A:
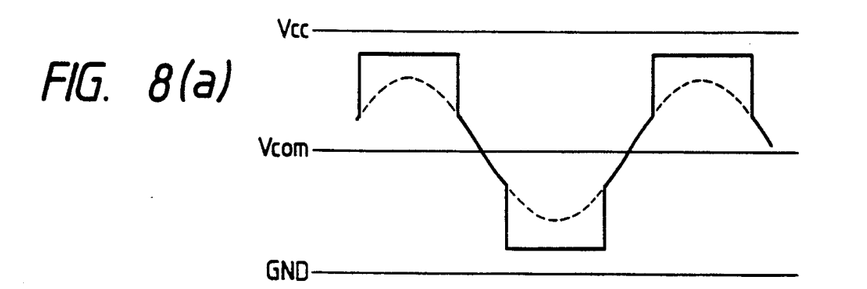
FIGS. 8a–8d are a time-domain diagram showing the waveforms of voltages in the brushless dc motor.
Figure 8B:
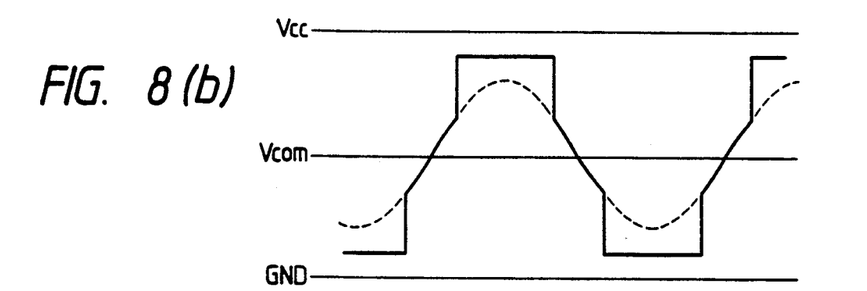
Figure 8C:
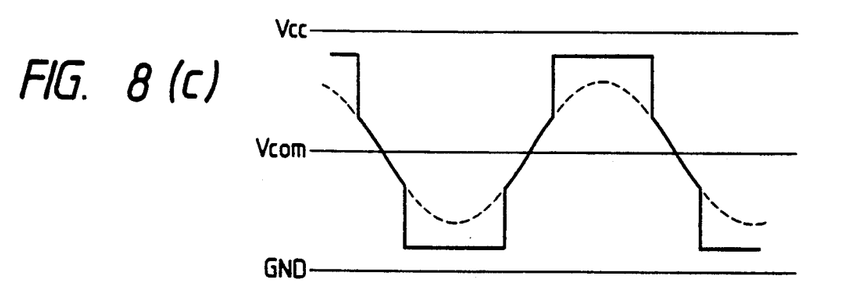
Figure 8D:
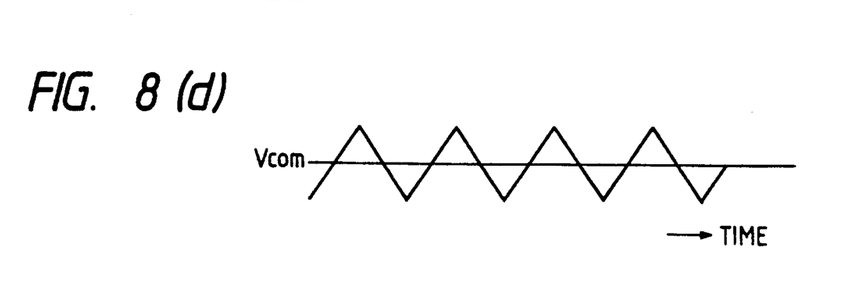

FIGS. 5-7 show the waveforms of various voltages at the stator windings "U", "V", and "W" which occur during the rotation of the rotor 30. In FIGS. 5-7: the solid lines denote the voltages at the ends "g", "h", and "i" of the stator winding "U", "V", and "W"; the dot-dash lines denote the common-junction voltage Vcom; Eu, Ev, and Ew (the dash lines) denote the back voltages induced in the stator windings "U", "V", and "W" respectively; Vcc denotes the power supply line voltage; and GND denotes the ground potential level. FIG. 5 shows conditions which occur when the rotor 30 rotates with a correct phase defined relative to the positions of the stator windings "U", "V", and "W". FIG. 6 shows conditions which occur when the rotor 30 rotates with a phase delayed from the correct phase. FIG. 7 shows conditions which occur when the rotor 30 rotates with a phase advanced from the correct phase.

The illustration of FIG. 5 is decomposed into the parts (a), (b), and (c) of FIG. 8 which show the voltages at the ends "i", "g", and "h" of the stator windings "U", "V", and "W" respectively.

As understood from FIGS. 5-8, in the case where the change of the supply of the drive currents to the stator windings "U", "V", and "W" is controlled so that the common-junction voltage Vcom will be held in a good triangular waveform such as shown in FIG. 5, the rotor 30 can be rotated with a correct phase.

The system controller 1 operates in accordance with a program stored in the internal ROM. This program is designed so as to execute the following processes.

Figure 9:
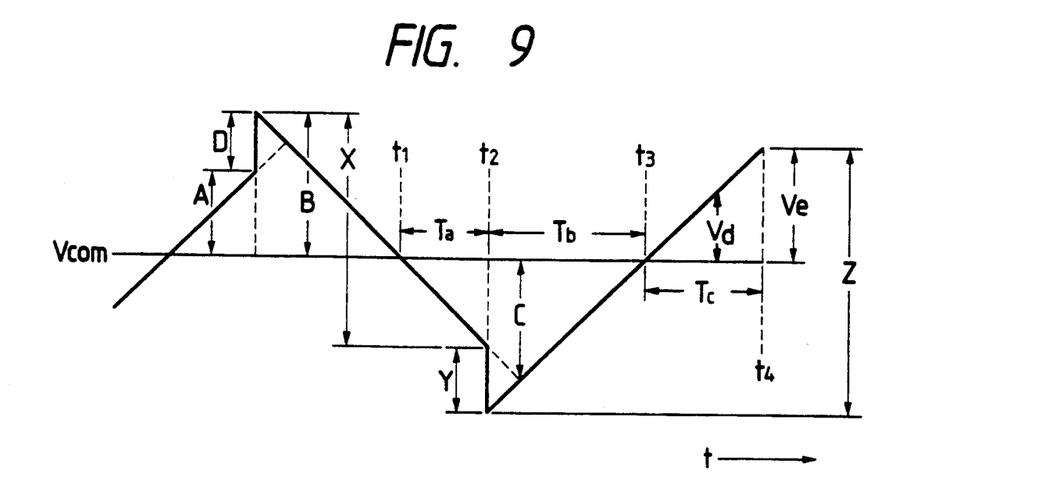
FIG. 9 is a time-domain diagram showing the waveform of a voltage at a common junction within the brushless dc motor.

The system controller 1 reads out the data of the reference voltage from the memory 2. The system controller 1 derives the value of the actual common-junction voltage Vcom from the output signal of the A/D converter 9. The system controller 1 decides whether or not the actual common-junction voltage Vcom is equal to the reference voltage. At a moment t1 where the actual common-junction voltage Vcom become equal to the reference voltage as shown in FIG. 9, the system controller 1 starts the timer 3. At a moment t2 which follows the moment t1 by a predetermined interval Ta as shown in FIG. 9, the system controller 1 receives a given time signal from the timer 3. The system controller 1 outputs a control signal to the switch controller 4 in response to the given time signal, so that the supply of the drive current to the stator windings "U", "V", and "W" will be changed. During an interval after the moment t2, the system controller 1 detects a moment t3 at which the actual common-junction voltage Vcom becomes equal to the reference voltage for the first time as shown in FIG. 9. At a moment t4 which follows the moment t3 by an interval Tc as shown in FIG. 9, the system controller 1 outputs a control signal to the switch controller 4 so as to execute a subsequent change of the supply of the drive current to the stator windings "U", "V", and "W". The interval Tc is exactly or approximately equal to the time "(Ta+Tb)/2" where Tb denotes the interval between the moments t2 and t3 as shown in FIG. 9. During an interval after the moment t4, the system controller 1 reiterates processes similar to the above-mentioned processes which are executed between the moments t1 and t4. As a result of this operation of the system controller 1, the rotator 30 can be rotated with a correct phase.

DESCRIPTION OF THE SECOND PREFERRED EMBODIMENT

A second embodiment of this invention is similar to the embodiment of FIGS. 1-9 except for the following design change. A program for operating the system controller 1 is designed so as to execute the following processes.

The system controller 1 detects the value "A" of the common-junction voltage Vcom which occurs at the moment of the end of the supply of the drive current to one of the stator windings "U", "V", and "W" as shown in FIG. 9. The system controller 1 detects the peak value "B" of the common-junction voltage which occurs immediately after the start of the supply of the drive current to the subsequent stator winding as shown in FIG. 9. The system controller 1 calculates the value "C" by referring to the equation "C=(A+B)/2". The system controller 1 decides whether or not the present value of the common-junction voltage Vcom is equal to the value "C", and detects a moment at which the common-junction voltage Vcom becomes equal to the value "C". Each time the system controller 1 detects that the common-junction voltage Vcom becomes equal to the value "C", the system controller 1 outputs a control signal to the switch controller 4 so that the supply of the drive current to the stator windings "U", "V", and "W" will be changed.

DESCRIPTION OF THE THIRD PREFERRED EMBODIMENT

A third embodiment of this invention is similar to the embodiment of FIGS. 1-9 except for the following design change. A program for operating the system controller 1 is designed so as to execute the following processes.

The system controller 1 detects the value of the common-junction voltage Vcom which occur at moments immediately before and after the moment of a first change of the supply of the drive current to the stator windings "U", "V", and "W", and calculates the difference "D" between the detected values of the common-junction voltage Vcom as shown in FIG. 9. The system controller 1 detects the value of the common-junction voltage Vcom which occurs immediately before the moment of a second change of the supply of the drive current to the stator windings "U", "V", and "W", and calculates the difference "X" between the detected values of the common-junction voltage Vcom as shown in FIG. 9. The system controller 1 detects the values of the common-junction voltage Vcom which occur immediately before and after the moment of a third change of the supply of the drive current to the stator windings "U", "V", and "W", and calculates the difference "Y" between the detected values of the common-junction voltage Vcom as shown in FIG. 9. The system controller 1 calculates the value "Z" from the differences "D", "X", and "Y" by referring to the equation "$Z=X+(D/2)-Y$" or "$Z=X-(D/2)+Y$". The system controller 1 decides whether or not the present value of the common-junction voltage Vcom is equal to the value "Z", and detects a moment at which the common-junction voltage Vcom becomes equal to the value "Z". Each time the system controller 1 detects that the common-junction voltage Vcom becomes equal to the value "C", the system controller 1 outputs a control signal to the switch controller 4 so that the current switching circuit 5 will change the supply of the drive current to the stator windings "U", "V", and "W".

DESCRIPTION OF THE FOURTH PREFERRED EMBODIMENT

A fourth embodiment of this invention is similar to the embodiment of FIGS. 1-9 except for the following design change.

As described previously, during the rotation of the rotor 30, the common-junction voltage Vcom depends on the induced back voltages. The back voltages are uniquely determined by the structure of the brushless dc motor and the speed of the rotation of the rotor 30. Thus, under conditions where the rotor 30 rotates with a correct phase, the amplitude of variations in the common-junction voltage Vcom has a fixed relation with the period of the variations. The fixed relation is expressed by the equation "$Ve=Ke/Tc$", where Ve denotes the difference between the reference voltage and the common-junction voltage Vcom which occurs at the moment of the change of the supply of the drive current to the stator windings "U", "V", and "W"; Ke denotes a predetermined constant depending on the structure of the brushless dc motor; and Tc denotes the interval between the moment at which the common-junction voltage Vcom becomes equal to the reference voltage and the moment at which the common-junction voltage Vcom peaks. It should be noted that the interval Tc depends on the speed of the rotation of the rotor 30.

A program for operating the system controller 1 is designed so as to execute the following processes. The system controller 1 decides whether or not the common-junction voltage Vcom is equal to the reference voltage. The system controller 1 detects the moment at which the common-junction voltage Vcom becomes equal to the reference voltage, and defines the detected moment as a reference moment. The system controller 1 measures the time elapsed from the reference moment and monitors the common-junction voltage Vcom. The system controller 1 detects the moment at which the monitored common-junction voltage Vcom peaks. The system controller 1 uses the elapsed time and the detected moment, and thereby calculates the interval Tc (see FIG. 9). The system controller 1 calculates the value Ve from the interval Tc by referring to the previously-mentioned equation. The system controller 1 detects whether or not the present value of the actual common-junction voltage Vcom is equal to the calculated value Ve. Each time system controller 1 detects that the actual common-junction voltage Vcom becomes equal to the calculated value Ve, the system controller 1 outputs a control signal to the switch controller 4 so that the current switching circuit 5 will change the supply of the drive current to the stator windings "U", "V", and "W".

DESCRIPTION OF THE FIFTH PREFERRED EMBODIMENT

Figure 10:
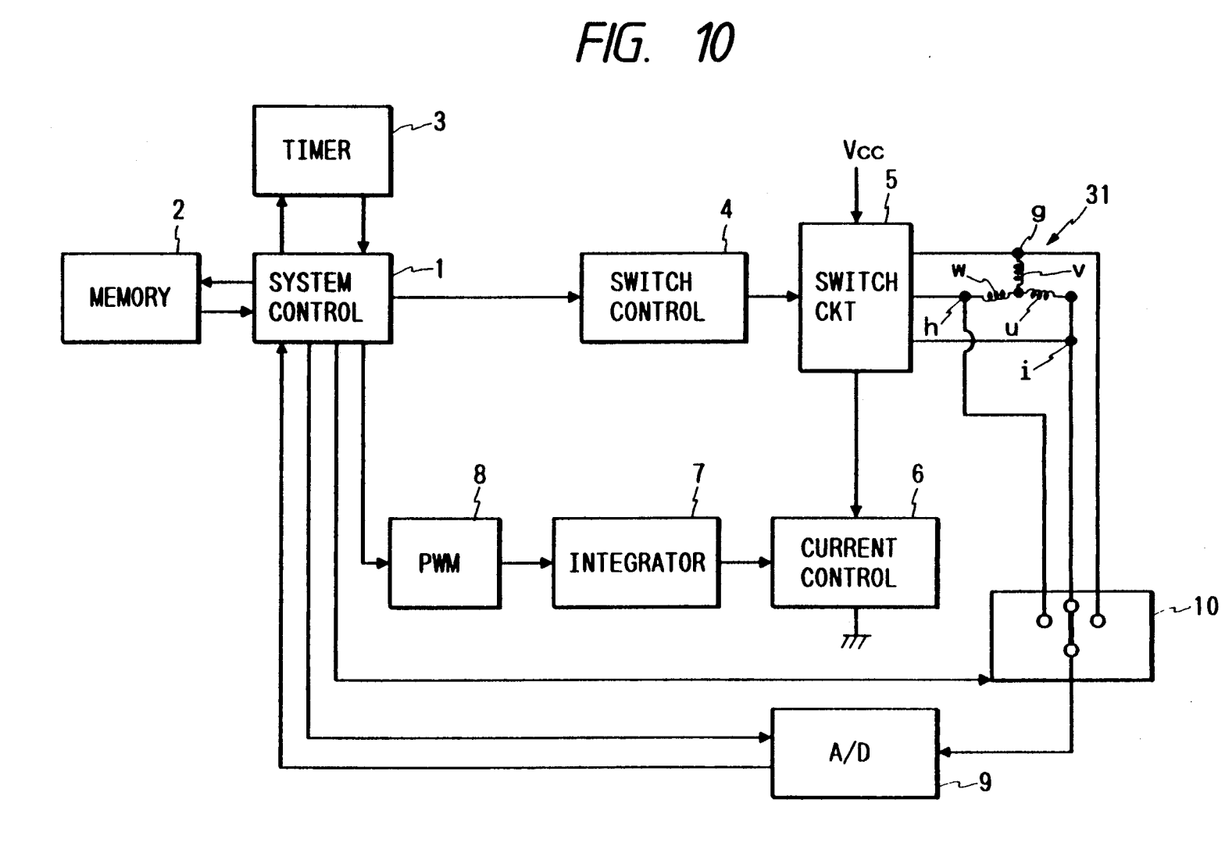
FIG. 10 is a block diagram of a brushless dc motor and a drive apparatus according to a fifth embodiment of this invention.

FIG. 10 shows a fifth embodiment of this invention which is similar to the embodiment of FIGS. 1-9 except for the following design changes. In the embodiment of FIG. 10, the connection between the common junction Pcom and the A/D converter 9 is omitted, and the ends "g", "h", and "i" of the stator windings "V", "W", and "U" are connected to the A/D converter 9 via a multiplexer 10. The multiplexer 10 sequentially selects one of the voltages at the stator winding ends "g", "h", and "i" and transmits the selected voltage to the A/D converter 9 in response to a control signal fed from the system controller 1. As a result, the system controller 1 is informed by the A/D converter 9 of data sequentially representing the voltages at the stator winding ends "g", "h", and "i". The control signal to the multiplexer 10 is generated by using the control signal to the switch controller 4 as a timing reference.

Specifically, the time segments of the voltages at the stator winding ends "g", "h", and "i" which occur during the de-energization of the stator windings respectively are sequentially selected by the multiplexer 10, so that the multiplexer 10 feeds the A/D converter 9 with a multiplexed signal which has a waveform such as shown in the part (d) of FIG. 8. The waveform of the multiplexed signal is similar to the waveform of the common-junction voltage Vcom of FIGS. 5-7. Accordingly, this embodiment uses the multiplexed signal in place of the common-junction voltage Vcom. In this embodiment, the phase of the rotation of the rotor 30 is controlled in response to the multiplexed signal by control processes similar to the control processes of any one of the first, second, third, and fourth embodiments.

What is claimed is:

1. An apparatus for driving a brushless dc motor having polyphase stator windings and a rotor, the polyphase stator windings having first ends and second ends, the first ends being connected in common at a common junction, means for selecting two of the polyphase stator windings and supplying a drive current to the selected two stator windings via the second ends of the selected two stator windings, and means for sequentially changing the selected two stator windings among the polyphase stator windings to rotate the rotor; the improvement comprising:

means for measuring a voltage at the common junction;

means for detecting an interval between a first moment at which the voltage measured by the measuring means becomes equal to a predetermined reference voltage and a subsequent second moment at which the voltage measured by the measuring means becomes again equal to the predetermined reference voltage;

means for outputting a control signal at a third moment which follows the second moment by an interval approximately equal to a half of the interval detected by the detecting means; and means for controlling the changing means to control said changing the selected two stator windings among the polyphase stator windings in response to the control signal outputted by the outputting means.

2. An apparatus for driving a brushless dc motor having polyphase stator windings and a rotor, the polyphase stator windings having first ends and second ends, the first ends being connected in common at a common junction, means for selecting two of the polyphase stator windings and supplying a drive current to the selected two stator windings via the second ends of the selected two stator windings, and means for sequentially changing the selected two stator windings among the polyphase stator windings to rotate the rotor; the improvement comprising:

means for measuring a voltage at the common junction;

means for detecting a first difference between a predetermined reference voltage and the voltage measured by the measuring means which occurs before a change of the selected two stator windings, for detecting a second difference between the predetermined reference voltage and the voltage measured by the measuring means which occurs after the change of the selected two stator windings, and for detecting a subsequent moment at which a difference between the reference voltage and the voltage measured by the measuring means becomes approximately equal to a half of a sum of the first difference and the second difference;

means for outputting a control signal at the moment detected by the detecting means; and means for controlling the changing means to control said changing the selected two stator windings among the polyphase stator windings in response to the control signal outputted by the outputting means.

3. An apparatus for driving a brushless dc motor having polyphase stator windings and a rotor, the polyphase stator windings having first ends and second ends, the first ends being connected in common at a common junction, means for selecting two of the polyphase stator windings and supplying a drive current to the selected two stator windings via the second ends of the selected two stator windings, and means for sequentially changing the selected two stator windings among the polyphase stator windings to rotate the rotor; the improvement comprising:

means for measuring a voltage at the common junction;

means for detecting a difference Vd between a predetermined reference voltage and the voltage measured by the measuring means;

means for outputting a control signal when the difference Vd detected by the detecting means becomes equal to a correct voltage Ve given as follows:

$$Ve = Ke/Tc$$

where Ke denotes a predetermined constant depending on a structure of the brushless dc motor, and Tc denotes an interval between a moment at which the voltage measured by the measuring means becomes equal to the reference voltage and a subsequent moment at which the voltage measured by the measuring means peaks; and means for controlling the changing means to control said changing the selected two stator windings among the polyphase stator windings in response to the control signal outputted by the outputting means.

4. An apparatus for driving a brushless dc motor having polyphase stator windings and a rotor, the polyphase stator windings having first ends and second ends, the first ends being connected in common at a common junction, means for selecting two of the polyphase stator windings and supplying a drive current to the selected two stator windings via the second ends of the selected two stator windings, and means for sequentially changing the selected two stator windings among the polyphase stator windings to rotate the rotor;

the improvement comprising:

means for measuring a voltage at the common junction;

means for detecting a first difference between the voltage measured by the measuring means which occurs before a first change of the selected two stator windings and the voltage measured by the measuring means which occurs after the first change of the selected two stator windings, for detecting a second difference between the voltage measured by the measuring means which occurs after the first change of the selected two stator windings and the voltage measured by the measuring means which occurs before a second change of the selected two stator windings, for detecting a third difference between the voltage measured by the measuring means which occurs before the second change of the selected two stator windings and the voltage measured by the measuring means which occurs after the second change of the selected two stator windings, and for, during a period after the second change of the selected two stator windings, detecting a fourth difference between the voltage measured by the measuring means and the voltage measured by the measuring means which occurs after the second change of the selected two stator windings;

means for calculating a voltage on the basis of the first, second, and third differences detected by the detecting means, and for outputting a control signal when the fourth difference becomes equal to the calculated voltage; and means for controlling the changing means to control said changing the selected two stator windings among the polyphase stator windings in response to the control signal outputted by the outputting means.

5. An apparatus for driving a brushless dc motor having polyphase stator windings and a rotor, the polyphase stator windings having first ends and second ends, the first ends being connected in common at a common junction, means for selecting two of the polyphase stator windings and supplying a drive current to the selected two stator windings via the second ends of the selected two stator windings, and means for sequentially changing the selected two stator windings among the polyphase stator windings to rotate the rotor; the improvement comprising:

means for measuring a voltage at a second end of a nonselected stator winding among the polyphase stator windings for each of the polyphase stator windings to obtain measured voltages at the second ends of the polyphase stator windings;

means for detecting an interval between a first moment at which the voltage measured by the measuring means becomes equal to a predetermined reference voltage and a subsequent second moment at which the voltage measured by the measuring means becomes again equal to the predetermined reference voltage;

means for outputting a control signal at a third moment which follows the second moment by an interval approximately equal to a half of the interval detected by the detecting means; and means for controlling the changing means to control said changing the selected two stator windings among the polyphase stator windings in response to the control signal outputted by the outputting means.

6. An apparatus for driving a brushless dc motor having polyphase stator windings and a rotor, the polyphase stator windings having first ends and second ends, the first ends being connected in common at a common junction, means for selecting two of the polyphase stator windings and supplying a drive current to the selected two stator windings via the second ends of the selected two stator windings, and means for sequentially changing the selected two stator windings among the polyphase stator windings to rotate the rotor; the improvement comprising;

means for measuring a voltage at a second end of a nonselected stator winding among the polyphase stator windings for each of the polyphase stator windings to obtain measured voltages at the second ends of the polyphase stator windings;

means for detecting a first difference between a predetermined reference voltage and the voltage measured by the measuring means which occurs before a change of the selected two stator windings, for detecting a second difference between the predetermined reference voltage and the voltage measured by the measuring means which occurs after the change of the selected two stator windings, and for detecting a subsequent moment at which a difference between the reference voltage and the voltage measured by the measuring means becomes approximately equal to a half of a sum of the first difference and the second difference;

means for outputting a control signal at the moment detected by the detecting means; and means for controlling the changing means to control said changing the selected two stator windings among the polyphase stator windings in response to the control signal outputted by the outputting means.

7. An apparatus for driving a brushless dc motor having polyphase stator windings and a rotor, the polyphase stator windings having first ends and second ends, the first ends being connected in common at a common junction, means for selecting two of the polyphase stator windings and supplying a drive current to the selected two stator windings via the second ends of the selected two stator windings, and means for sequentially changing the selected two stator windings among the polyphase stator windings to rotate the rotor; the improvement comprising:

means for measuring a voltage at a second end of a nonselected stator winding among the polyphase stator windings for each of the polyphase stator windings to obtain measured voltages at the second ends of the polyphase stator windings;

means for detecting a difference Vd between a predetermined reference voltage and the voltage measured by the measuring means;

means for outputting a control signal when the difference Vd detected by the detecting means becomes equal to a correct voltage Ve given as follows:

$$Ve = Ke/Tc$$

where Ke denotes a predetermined constant depending on a structure of the brushless dc motor, and Tc denotes an interval between a moment at which the voltage measured by the measuring means becomes equal to the reference voltage and a subsequent moment at which the voltage measured by the measuring means peaks; and means for controlling the changing means to control said changing the selected two stator windings among the polyphase stator windings in response to the control signal outputted by the outputting means.

8. An apparatus for driving a brushless dc motor having polyphase stator windings and a rotor, the polyphase stator windings having first ends and second ends, the first ends being connected in common at a common junction, means for selecting two of the polyphase stator winding and supplying a drive current to the selected two stator windings via the second ends of the selected two stator windings, and means for sequentially changing the selected two stator windings among the polyphase stator windings to rotate the rotor; the improvement comprising:

means for measuring a voltage at a second end of a nonselected stator winding among the polyphase stator windings for each of the polyphase stator windings to obtain measured voltages at the second ends of the polyphase stator windings;

means for detecting a first difference between the voltage measured by the measuring means which occurs before a first change of the selected two stator windings and the voltage measured by the measuring means which occurs after the first change of the selected two stator windings, for detecting a second difference between the voltage measured by the measuring means which occurs after the first change of the selected two stator windings and the voltage measured by the measuring means which occurs before a second change of the selected two stator windings, for detecting a third difference between the voltage measured by the measuring means which occurs before the second change of the selected two stator windings and the voltage measured by the measuring means which occurs after the second change of the selected two stator windings, and for, during a period after the second change of the selected two stator windings, detecting a fourth difference between the voltage measured by the measuring means and the voltage measured by the measuring means which occurs after the second change of the selected two stator windings;

means for calculating a voltage on the basis of the first, second, and third differences detected by the detecting means, and for outputting a control signal when the fourth difference becomes equal to the calculated voltage; and means for controlling the changing means to control said changing the selected two stator windings among the polyphase stator windings in response to the control signal outputted by the outputting means.

9. An apparatus for driving a brushless dc motor having polyphase stator windings and a rotor, the polyphase stator windings having first ends and second ends, the first ends being connected in common at a common junction, means for selecting two of the polyphase stator windings and supplying a drive current to the selected two stator windings via the second ends of the selected two stator windings, and means for sequentially changing the selected two stator windings among the polyphase stator windings to rotate the rotor; the improvement comprising:

means for measuring a voltage corresponding to a back electromotive force in a nonselected stator winding among the polyphase stator windings;

means for detecting an interval between a first moment at which the voltage measured by the measuring means becomes equal to a predetermined reference voltage and a subsequent second moment at which the voltage measured by the measuring means becomes again equal to the predetermined reference voltage;

means for outputting a control signal at a third moment which follows the second moment by an interval approximately equal to a half of the interval detected by the detecting means; and means for controlling the changing means to control said changing the selected two stator windings among the polyphase stator windings in response to the control signal outputted by the outputting means.

10. An apparatus for driving a brushless dc motor having polyphase stator windings and a rotor, the polyphase stator windings having first ends and second ends, the first ends being connected in common at a common junction, means for selecting two of the polyphase stator windings and supplying a drive current to the selected two stator windings via the second ends of the selected two stator windings, and means for sequentially changing the selected two stator windings among the polyphase stator windings to rotate the rotor; the improvement comprising:

means for measuring a voltage corresponding to a back electromotive force in a nonselected stator winding among the polyphase stator windings;

means for detecting a first difference between a predetermined reference voltage and the voltage measured by the measuring means which occurs before a change of the selected two stator windings, for detecting a second difference between the predetermined reference voltage and the voltage measured by the measuring means which occurs after the change of the selected two stator windings, and for detecting a subsequent moment at which a difference between the reference voltage and the voltage measured by the measuring means becomes approximately equal to a half of a sum of the first difference and the second difference;

means for outputting a control signal at the moment detected by the detecting means; and means for controlling the changing means to control said changing the selected two stator windings among the polyphase stator windings in response to the control signal outputted by the outputting means.

11. An apparatus for driving a brushless dc motor having polyphase stator windings and a rotor, the polyphase stator windings having first ends and second ends, the first ends being connected in common at a common junction, means for selecting two of the polyphase stator windings and supplying a drive current to the selected two stator windings via the second ends of the selected two stator windings, and means for sequentially changing the selected two stator windings among the polyphase stator windings to rotate the rotor; the improvement comprising:

means for measuring a voltage corresponding to a back electromotive force in a nonselected stator winding among the polyphase stator windings;

means for detecting a difference Vd between a predetermined reference voltage and the voltage measured by the measuring means;

means for outputting a control signal when the difference Vd detected by the detecting means becomes equal to a correct voltage Ve given as follows:

$$Ve = Ke/Tc$$

where Ke denotes a predetermined constant depending on a structure of the brushless dc motor, and Tc denotes an interval between a moment at which the voltage measured by the measuring means becomes equal to the reference voltage and a subsequent moment at which the voltage measured by the measuring means peaks; and means for controlling the changing means to control said changing the selected two stator windings among the polyphase stator windings in response to the control signal outputted by the outputting means.

12. An apparatus for driving a brushless dc motor having polyphase stator windings and a rotor, the polyphase stator windings having first ends and second ends, the first ends being connected in common at a common junction, means for selecting two of the polyphase stator windings and supplying a drive current to the selected two stator windings via the second ends of the selected two stator windings, and means for sequentially changing the selected two stator windings among the polyphase stator windings to rotate the rotor; the improvement comprising:

means for measuring a voltage corresponding to a back electromotive force in a nonselected stator winding among the polyphase stator windings;

means for detecting a first difference between the voltage measured by the measuring means which occurs before a first change of the selected two stator windings and the voltage measured by the measuring means which occurs after the first change of the selected two stator windings, for detecting a second difference between the voltage measured by the measuring means which occurs after the first change of the selected two stator windings and the voltage measured by the measuring means which occurs before a second change of the selected two stator windings, for detecting a third difference between the voltage measured by the measuring means which occurs before the second change of the selected two stator windings and the voltage measured by the measuring means which occurs after the second change of the selected two stator windings, and for, during a period after the second change of the selected two stator windings, detecting a fourth difference between the voltage measured by the measuring means and the voltage measured by the measuring means which occurs after the second change of the selected two stator windings;

means for calculating a voltage on the basis of the first, second, and third differences detected by the detecting means, and for outputting a control signal when the fourth difference becomes equal to the calculated voltage; and means for controlling the changing means to control said changing the selected two stator windings among the polyphase stator windings in response to the control signal outputted by the outputting means.

13. The apparatus of claim 1, wherein the detecting means and the outputting means comprise a ROM storing a program, and a microprocessor operating in accordance with the program stored in the ROM.

14. The apparatus of claim 2, wherein the detecting means and the outputting means comprise a ROM storing a program, and a microprocessor operating in accordance with the program stored in the ROM.

15. The apparatus of claim 3, wherein the detecting means and the outputting means comprise a ROM storing a program, and a microprocessor operating in accordance with the program stored in the ROM.

16. The apparatus of claim 4, wherein the detecting means and the outputting means comprise a ROM storing a program, and a microprocessor operating in accordance with the program stored in the ROM.

17. The apparatus of claim 5, wherein the detecting means and the outputting means comprise a ROM storing a program, and a microprocessor operating in accordance with the program stored in the ROM.

18. The apparatus of claim 6, wherein the detecting means and the outputting means comprise a ROM storing a program, and a microprocessor operating in accordance with the program stored in the ROM.

19. The apparatus of claim 7, wherein the detecting means and the outputting means comprise a ROM storing a program, and a microprocessor operating in accordance with the program stored in the ROM.

20. The apparatus of claim 8, wherein the detecting means and the outputting means comprise a ROM storing a program, and a microprocessor operating in accordance with the program stored in the ROM.

21. The apparatus of claim 9, wherein the detecting means and the outputting means comprise a ROM storing a program, and a microprocessor operating in accordance with the program stored in the ROM.

22. The apparatus of claim 10, wherein the detecting means and the outputting means comprise a ROM storing a program, and a microprocessor operating in accordance with the program stored in the 23. The apparatus of claim 11, wherein the detecting means and the outputting means comprise a ROM storing a program, and a microprocessor operating in accordance with the program stored in the ROM.

24. The apparatus of claim 12, wherein the detecting means and the outputting means comprise a ROM storing a program, and a microprocessor operating in accordance with the program stored in the ROM.

25. The apparatus of claim 9, wherein the measuring means comprises means for, during rotation of the rotor, sequentially selecting and transmitting voltages corresponding to back electromotive forces in nonselected stator windings among the polyphase stator windings.

26. The apparatus of claim 10, wherein the measuring means comprises means for, during rotation of the rotor, sequentially selecting and transmitting voltages corresponding to back electromotive forces in nonselected stator windings among the polyphase stator windings.

27. The apparatus of claim 11, wherein the measuring means comprises means for, during rotation of the rotor, sequentially selecting and transmitting voltages corresponding to back electromotive forces in nonselected stator windings among the polyphase stator windings.

28. The apparatus of claim 12, wherein the measuring means comprises means for, during rotation of the rotor, sequentially selecting and transmitting voltages corresponding to back electromotive forces in nonselected stator windings among the polyphase stator windings.

29. The apparatus of claim 1, further comprising a digital-to-analog converter for converting a digital value, representing a current to be supplied to the selected two stator windings, into a corresponding analog value, and means for controlling the current to be supplied to the selected two stator windings in response to an output signal of the digital-to-analog converter.

30. The apparatus of claim 2, further comprising a digital-to-analog converter for converting a digital value, representing a current to be supplied to the selected two stator windings, into a corresponding analog value, and means for controlling the current to be supplied to the selected two stator windings in response to an output signal of the digital-to-analog converter.

31. The apparatus of claim 3, further comprising a digital-to-analog converter for converting a digital value, representing a current to be supplied to the selected two stator windings, into a corresponding analog value, and means for controlling the current to be supplied to the selected two stator windings in response to an output signal of the digital-to-analog converter.

32. The apparatus of claim 4, further comprising a digital-to-analog converter for converting a digital value, representing a current to be supplied to the selected two stator windings, into a corresponding analog value, and means for controlling the current to be supplied to the selected two stator windings in response to an output signal of the digital-to-analog converter.

33. The apparatus of claim 5, further comprising a digital-to-analog converter for converting a digital value, representing a current to be supplied to the selected two stator windings, into a corresponding analog value, and means for controlling the current to be supplied to the selected two stator windings in response to an output signal of the digital-to-analog converter.

34. The apparatus of claim 6, further comprising a digital-to-analog converter for converting a digital value, representing a current to be supplied to the selected two stator windings, into a corresponding analog value, and means for controlling the current to be supplied to the selected two stator windings in response to an output signal of the digital-to-analog converter.

35. The apparatus of claim 7, further comprising a digital-to-analog converter for converting a digital value, representing a current to be supplied to the selected two stator windings, into a corresponding analog value, and means for controlling the current to be supplied to the selected two stator windings in response to an output signal of the digital-to-analog converter.

36. The apparatus of claim 8, further comprising a digital-to-analog converter for converting a digital value, representing a current to be supplied to the selected two stator windings, into a corresponding analog value, and means for controlling the current to be supplied to the selected two stator windings in response to an output signal of the digital-to-analog converter.

37. The apparatus of claim 9, further comprising a digital-to-analog converter for converting a digital value, representing a current to be supplied to the selected two stator windings, into a corresponding analog value, and means for controlling the current to be supplied to the selected two stator windings in response to an output signal of the digital-to-analog converter.

38. The apparatus of claim 10, further comprising a digital-to-analog converter for converting a digital value, representing a current to be supplied to the selected two stator windings, into a corresponding analog value, and means for controlling the current to be supplied to the selected two stator windings in response to an output signal of the digital-to-analog converter.

39. The apparatus of claim 11, further comprising a digital-to-analog converter for converting a digital value, representing a current to be supplied to the selected two stator windings, into a corresponding analog value, and means for controlling the current to be supplied to the selected two stator windings in response to an output signal of the digital-to-analog converter.

40. The apparatus of claim 12, further comprising a digital-to-analog converter for converting a digital value, representing a current to be supplied to the selected two stator windings, into a corresponding analog value, and means for controlling the current to be supplied to the selected two stator windings in response to an output signal of the digital-to-analog converter.

41. The apparatus of claim 1, further comprising a magnetic disk connected to the rotor.

42. The apparatus of claim 2, further comprising a magnetic disk connected to the rotor.

43. The apparatus of claim 3, further comprising a magnetic disk connected to the rotor.

44. The apparatus of claim 4, further comprising a magnetic disk connected to the rotor.

45. The apparatus of claim 5, further comprising a magnetic disk connected to the rotor.

46. The apparatus of claim 6, further comprising a magnetic disk connected to the rotor.

47. The apparatus of claim 7, further comprising a magnetic disk connected to the rotor.

48. The apparatus of claim 8, further comprising a magnetic disk connected to the rotor.

49. The apparatus of claim 9, further comprising a magnetic disk connected to the rotor.

50. The apparatus of claim 10, further comprising a magnetic disk connected to the rotor.

51. The apparatus of claim 11, further comprising a magnetic disk connected to the rotor.

52. The apparatus of claim 12, further comprising a magnetic disk connected to the rotor.

* * * * *